United States Patent [19]

Watanabe et al.

[11] Patent Number: 4,756,607
[45] Date of Patent: Jul. 12, 1988

[54] OPTICAL ISOLATOR DEVICE HAVING TWO CASCADED ISOLATOR ELEMENTS WITH DIFFERENT LIGHT BEAM ROTATION ANGLES

[75] Inventors: Nobutaka Watanabe; Yuichi Odagiri, both of Tokyo, Japan

[73] Assignee: NEC Corporation, Tokyo, Japan

[21] Appl. No.: 71,500

[22] Filed: Jul. 9, 1987

[30] Foreign Application Priority Data

Jul. 9, 1986 [JP] Japan .................................. 61-162271

[51] Int. Cl.[4] .......................... G02F 1/29; G02F 1/09
[52] U.S. Cl. ..................................... 350/375; 350/376
[58] Field of Search ................ 350/375, 377, 387, 405

[56] References Cited

U.S. PATENT DOCUMENTS 4,668,052  5/1987  Shirasaki ........................... 350/377

FOREIGN PATENT DOCUMENTS 130934   7/1985  Japan .................................. 350/375
292613  12/1986  Japan .................................. 350/375

*Primary Examiner*—William H. Punter
*Attorney, Agent, or Firm*—Sughrue, Mion, Zinn, Macpeak & Seas

[57] ABSTRACT

In an optical isolator device using a Faraday rotator for permitting a forward light beam to pass therethrough but for preventing a reverse light beam from passing therethrough, two Faraday rotators are used in a cascade-connection in order to improve the temperature characteristic of the isolation over a wide temperature range. One of two Faraday rotators is prepared to have the Faraday rotation angle of 45° for a wavelength shorter than the intended wavelength $\lambda_0$, while the other having the Faraday rotation angle of 45° for a wavelength longer than $\lambda_0$. A polarizer and an analyzer are disposed on opposite ends of one of the rotators at a rear stage and prevent the reverse light beam from passing therethrough. Another polarizer and another analyzer can further be disposed at opposite ends of the other front stage rotator so that two isolators are arranged in a cascade-connection. The rotation angular deviation of the light beam caused at the front stage rotator by the temperature variation is cancelled by the rotation angular deviation caused at the rear stage rotator by the same temperature variation.

10 Claims, 2 Drawing Sheets

OPTICAL ISOLATOR DEVICE HAVING TWO CASCADED ISOLATOR ELEMENTS WITH DIFFERENT LIGHT BEAM ROTATION ANGLES

BACKGROUND OF THE INVENTION (1) Field of the Invention

The present invention relates to an optical isolator device for use in an optical transmission system and, in particular, to such an optical isolator device having an improved optical isolation temperture characteristic.

(2) Description of the Prior Art

The optical isolator device is a device for permitting a polarized light beam to be transmitted therethrough in a forward direction along an optical axis but preventing a polarized light beam from passing therethrough in a reverse direction.

In an optical transmission system, the optical isolator is disposed between an oscillator (light source) and an end surface of the optical fiber transmission line. A light beam emitted from the oscillator passes through the optical isolator to the optical fiber transmission line. A portion of the light beam is reflected at the end surface of the optical fiber transmission line but is stopped by the optical isolator, so that the oscillator is protected from the reflected light beam and can effect the stabilized oscillation.

A conventional optical isolator device comprises a beam rotator for rotating the plane of polarization of an incident light beam by an angle of 45° and two polarization selecting elements being disposed at opposite sides of the beam rotator on the optical axis for selecting and transmitting therethrough a polarized light beam having the plane of polarization in a special direction.

A Faraday rotator is usually used for the beam rotator. The Faraday rotator is a device using the Faraday effect which is one of magnetooptical effects and comprises a cylindrical magnet having a central axis and a magnetooptical element disposed on the central axis.

The polarization selecting element is, for example, a Rochon polarizing prism and has a transmission direction of the plane of polarization for allowing a light beam to pass therethrough only if the light beam has the plane of polarization coincident with the transmission direction. One of the two polarization selecting elements is disposed on an input side of the beam rotator for a light beam transmitted in a forward direction and is called an polarizer. The other one is disposed on an output side of the beam rotator for the forward light beam and is called an analyzer. The transmission direction of the analyzer is oriented at an angular position offset from that of the polarizer by 45° in the rotating direction of the beam rotator.

In operation, the polarizer receives the forward light from the oscillator and selects and transmits a polarized component which is coincident with its transmission direction. The polarized component passes through the beam rotator with rotation by the angle of 45° and emitted through the analyzer to the optical fiber transmission line. The emitted light beam is partially reflected at the end surface of the optical fiber transmission line and transmits through the analyzer in the reverse direction. The reverse light beam passes through the beam rotator and is rotated by the angle of 45° at the beam rotator. Accordingly, the plane of polarization of the reverse light beam after passing through the beam rotator is offset by an angle of 90° from the transmission direction of the polarizer, so that the reverse light beam is stopped by the polarizer. Therefore, the reflected light beam is prevented from being injected into the oscillator.

For a conventional optical isolator device, reference is made to No. JP-A- 57-17919 (Japanese patent application laid open with a publication No. 17919/82). For details of a known Faraday rotator, reference is made to U.S. Pat. No. 4,522,473 by Hibiya et al, assigned to Nippon Electric Co., Ltd.

However, the optical isolator device cannot completely block the reverse light beam from passing therethrough because the plane of polarization of the reverse light beam after passing through the beam rotator is not completely offset by 90° from the transmission direction of the polarizer but has a deviation of an angle of several degrees due to a variation of the rotation angle of the beam rotator in response to the circumferential temperature variation. That is, the isolation characteristic of the conventional optical isolator device is degraded by the circumferential temperature variation.

In order to improve the isolation characteristic of the optical isolator device, an approach was proposed by Fukushima et al where two similar optical isolators were connected in cascade to realize an improved isolation. For details of the proposed optical isolator device, reference is made to a paper entitled "Improvement of Isolation Characteristic of Optical Isolator for Single Mode Optical Fiber" by Fukushima et al, published in Summaries of National Conference of The Institute of Electronics, Information and Communication Engineers on Light and Electromagnetic Wave held in 1984.

In the proposed isolator device comprising two similar optical isolators connected in cascade, the isolation characteristic is improved in comparison with a single optical isolator. However, the temperature dependency of the Faraday rotation angle of the Faraday rotator becomes twice effectively so that a desired isolation cannot be insured over a wide temperature range.

SUMMARY OF THE INVENTION:

It is an object of the present invention to provide an optical isolator device where a desired isolation is insured over a wide temperature range.

As described above, an optical isolator device is a device for permitting a polarized light beam to be transmitted therethrough in a forward direction along an optical axis but preventing a polarized light beam from passing therethrough in a reverse direction.

An optical isolator device according to the present invention comprises a first optical port being disposed on the optical axis for receiving a forward light beam of a predetermined wavelength ($\lambda_0$) to transmit the forward light beam with a predetermined plane of polarization and a second optical port being spaced from the first optical port on the optical axis for emitting the forward light beam from the optical isolator device. The second optical port serves as an input port for a reverse light beam. First beam rotating means is disposed on the optical axis adjacent the first optical port for rotating, by a first rotation angle in a rotating direction, the plane of polarization of a light beam passing therethrough in any one of the forward and the reverse directions. The first beam rotating means, therefore, rotates the plane of polarization of the forward light beam from the first optical port and emits the forward light beam therethrough as a first rotated light beam with a first rotated plane of polarization. First polarization selecting means is disposed adjacent the first beam rotating means and has a first transmission direction of the plane of polarization for selectively allowing only one plane-polarized light beam to pass therethrough. The first polarization selecting means is oriented so that the first transmission direction coincides with the first rotated plane of polarization to thereby transmit the first rotated light beam therethrough. Second beam rotating means is disposed on the optical axis between the first polarization selecting means and the second optical port for rotating, by a second rotation angle in the same rotating direction, the plane of polarization of a light beam passing therethrough in any one of the forward and the reverse directions. The second beam rotating means, therefore, rotates the first rotated light beam plane of polarization of the first rotated light beam and emits the forward light beam therethrough as a second rotated light beam having a second rotated plane of polarization. One of the first and second beam rotating means is prepared to have a first rotation angle of 45° for a first light component having a wavelength ($\lambda_1$) shorter than the predetermined wavelength ($\lambda_0$), while the other is prepared to have a second rotation angle of 45° for a second light component having a wavelength ($\lambda_2$) longer than the predetermined wavelength ($\lambda_0$). Second polarization selecting means is disposed at the second optical port and has a second transmission direction of the plane of polarization for selectively allowing only one plane-polarized light beam to pass therethrough. The second polarization selecting means is oriented so that the second transmission direction is at an angular position offset from the first transmission direction by 45° in the rotating direction. Therefore, the second polarization selecting means transmits the second rotated light beam therethrough as the forward light beam. The reverse light beam passes through the second polarization selecting means with a plane of polarization equal to the second transmission direction but is stopped by the first polarization selecting means after rotated by the second beam rotating means.

Each of the first and second beam rotating means may be a Faraday rotator comprising a cylindrical magnet having a central axis and a magnetooptical element disposed on the central axis.

DESCRIPTION OF PREFERRED EMBODIMENTS:

Prior to description of embodiments of the present invention, a conventional optical isolator device can be described with reference to FIG. 1 in order to help better understanding of the present invention.

Figure 1:
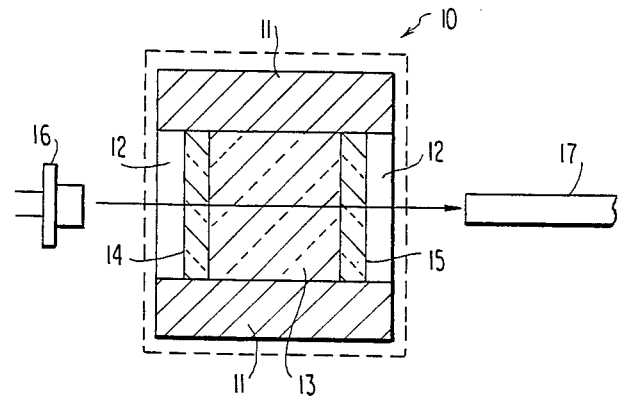
FIG. 1 is a horizontal sectional view schematically illustrating a conventional optical isolator device together with a light source and an optical fiber.

Referring to FIG. 1, a conventional optical isolator device 10 shown therein comprises a cylindrical permanent magnet 11 having a hollow portion 12 therein. A magnetooptical element 13, for example, a yitrium-iron-garnet ($Y_3Fe_5O_{12}$) single crystal is disposed in the hollow portion 12. An optical axis of the magnetooptical element 13 is coincident with a central axis of the cylindrical permanent magnet 11. A Faraday rotator is constituted of the permanent magnet 11 and the magnetooptical element 13. The Faraday rotator rotates, by an angle of 45°, the plane of polarization of a light beam passing therethrough.

A polarizer 14 and an analyzer 15 are disposed on opposite sides of the magnetooptical element 13 on the optical axis. The transmission direction of the analyzer 15 is oriented offset by an angle of 45° from that of the polarizer 14, as described in a preamble of the description.

A light source 16, for example, a laser diode is disposed on one side of the optical isolator device 10 to face the polarizer 14 on the optical axis and emits a laser light beam towards the polarizer 14. An optical fiber 17 is disposed on the opposite side of the optical isolator 10 and has an end surface confronting with the analyzer 15 on the optical axis.

A light beam emitted from the laser diode 16 passes through the optical isolator device 10 and is incident to the optical fiber 17, and a portion of the light beam is reflected from the end surface of the optical fiber 17. However, the reflected light beam is stoppped by the optcial isolator device 10, as described in the preamble of the description.

However, the conventional optical isolator device has a disadvantage in the isolation to temperature characteristic as also described in the preamble of the description.

Generally speaking, the present invention attempts to use two cascade-connected optical isolator elements which are prepared to have a rotation angle of 45° for different light beam components having wavelengths shorter than and longer than a light beam of an intended wavelength in an optical transmission system, respectively.

Figure 2:
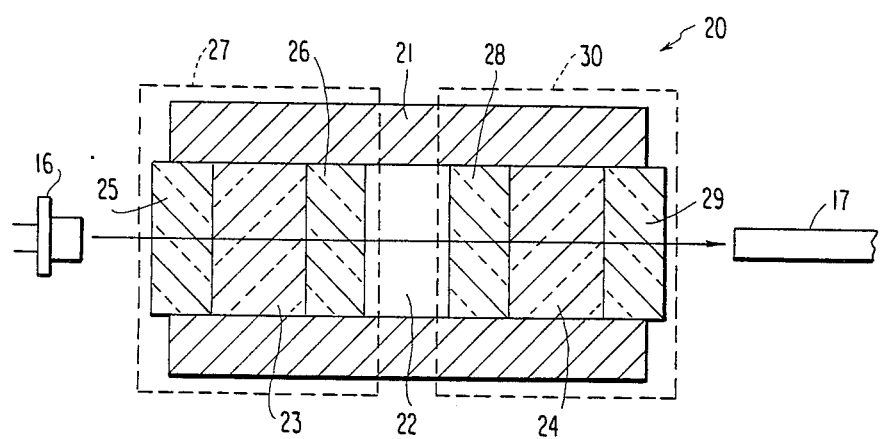
FIG. 2 is a horizontal sectional view schematically illustrating an optical isolator device according to an embodiment of the present invention together with a light source and an optical fiber.

Referring to FIG. 2, an optical isolator device 20 according to an embodiment of the present invention is disposed on an optical axis between a light source 16 such as a laser diode and an end surface of an optical fiber 17.

In the shown embodiment, the laser diode 16 oscillates a light beam having a wavelength of $\lambda_0$ (=1,310 nm in this embodiment) which is used as a transmission light in the optical transmission system.

The optical isolator device 20 comprises a cylindrical permanent magnet 21 having a hollow portion 22. Two magnetooptical elements 23 and 24 are disposed in the hollow portion 22 and are spaced from each other on a central axis of the hollow portion 22 which is coincident with the optical axis. A Faraday rotator is constituted of the permanent magent 21 and the magnetooptical element 23 and rotates, in a rotating direction, the plane of polarization of a light beam passing therethrough. While, another Faraday rotator is also constituted of the permanent magnet 21 and the magnetooptical element 24 and rotates, in the same rotating direction, the plane of polarization of a light beam passing therethrough.

The Faraday rotator (21–23) is prepared to have a Faraday rotation angle of 45° for a light beam of a wavelength $\lambda_1$ (=1,250 nm in this embodiment) shorter than the wavelength $\lambda_0$, while the other Faraday rotator (21-24) is prepared to have the same rotation angle for a lighty beam of a wavelength $\lambda_2$ longer than the wavelength $\lambda_0$ ($\lambda_2 = 1,370$ nm in this embodiment).

The Faraday rotation angle $\theta$ is generally represented by the following equation (1);

$$\theta = V H L \qquad (1),$$

where V is the Verdet constant, H is a magnetic field strength induced on the magnetooptical element, and L is a length of the magnetooptical element through which the light beam passes. The Verdet constant is determined by a wavelength of the light beam, materials of the magnetooptical element, and others. Therefore, the Faraday rotation angle can be adjusted to a desired value for a light beam of a desired wavelength by selection of materials, the magentic field strength H, and the length L.

Figure 3:
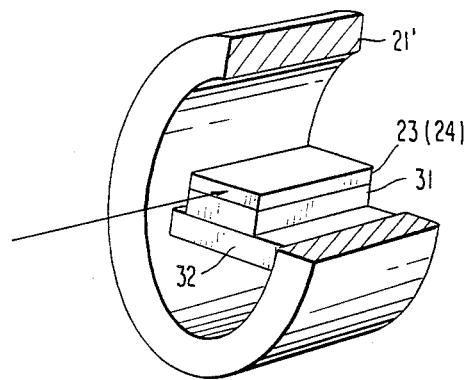
FIG. 3 is a partially sectioned perspective view of a Faraday rotator used in the embodiment of FIG. 2.

Referring to FIG. 3, an example of the Faraday rotator used in the embodiment of FIG. 2 comprises a cylindrical permanent magnet 21' and the magnetooptical element 23 (or 24). The magnetooptical element 23 is a bisumuth-substitution-type gadlinium-iron garnet $((GdBi)_3(FeAlGa)_5O_{12})$ film formed on a gadlinium-garium garnet $(Gd_3Ga_5O_{12})$ substrate 31 by the liquid-phase epitaxial growing technique.

The longitudinal dimension of the grown film along the optical axis is adjusted to have the Faraday rotation angle of 45° for the wavelength of $\lambda_1$ or $\lambda_2$.

In FIG. 2, a single body of the permanent magnet 21 is commonly used for the two Faraday rotators. However, different permanent magnets can be used for different Faraday rotators, respectively, so that one magnetooptical element 23 (or 24) is disposed in one permanent magnet 21', as shown in FIG. 3.

The substrate 31 having the magnetooptical element 23 in a form of a film is mounted on a mount plate 32 fixed to the inner surface of the permanent magnet 21' so that the magnetooptical element 23 is fixedly disposed on the optical axis.

Referring to FIG. 2 again, a polarizer 25 is disposed on one end surface of the magnetooptical element 23 and faces the laser diode 16. An analyzer 26 is disposed on the opposite end surface of the magnetooptical element 23. The transmission direction of the analyzer 26 is oriented offset from that of the polarizer 25 by an angle of 45° in the rotating direction of the Faraday rotator (21-23) so that an optical isolator 27 is constituted of permanent magnet 21, magnetooptical element 23, polarizer 25, and analyzer 26.

Another polarizer 28 is disposed on a front end surface of the magnetooptical element 24 and faces the analyzer 26. The polarizer 28 has the transmission direction which is oriented at the same angle as that of the analyzer 26. Another analyzer 29 is disposed on a rear end surface of the magnetooptical element 24 and has the transmission direction which is oriented at an angle offset from that of the polarizer 28 by 45° in the rotating direction of the Faraday rotator (21-24). Thus, another optical isolator 30 is also constituted of magnet 21, magnetooptical element 24, polarizer 28, and analyzer 29.

In this embodiment, Rochon polarizing prisms are used for the polarizers and the analyzers.

In operation, the light beam emitted from the laser diode 16 is incident to the polarizer 25 which serves as an input optical port for the light beam. The polarizer 25 transmits only a component of the light beam having the plane of polarization which is coincident with the transmission direction of the polarizer 25. The transmitted light beam passes through the magnetooptical element 23 and is rotated due to the Faraday effect. The rotated light beam is applied to the analyzer 26. The analyzer 26 transmits only a component of the rotated light beam which has the plane of polarization coincident with the transmission direction of the analyzer 26.

The light beam passing through the analyzer 26 also passes through the polarizer 28 because the transmission direction of the analyzer 26 coincides with that of the polarizer 28. The light beam passing through the polarizer 28 further passes through the magnetooptical element 24 and is rotated due to the Faraday effect. The rotated light beam is incident to the analyzer 29 which transmits therethrough a component of the light beam coincident with the transmission direction of the analyzer 29. The transmitted light beam is emitted to the optical fiber 17 from the analyzer 29 which serves as an output optical port for the light beam.

The light beam emitted from the analyzer 29 is transmitted through the optical fiber 17, but is partially reflected from the end surface of the optical fiber 17. The reflected light beam partially passes through the analyzer 29 in a reverse direction and rotated by the Faraday rotator (21-24). Therefore, the plane of polarization of the rotated reverse light beam is generally perpendicular to the transmission direction of the polarizer 28. So that the reverse light beam is almost stopped by the polarizer 28. However, a small amount of light beam passes through the polarizer 28 and is rotated by the Faraday rotator (21-23) after passing through the analyzer 26. Therefore, the plane of polarization of the reverse light beam is approximately perpendicular to the transmission direction of the polarizer 25. Thus, the reverse light beam is stopped by the polarizer 25.

As described above, the Faraday rotation angle of each of the Faraday rotators (21-23) and (21-24) is prepared to be 45° for a wavelength different from the wavelength $\lambda_0$ of the light beam emitted from the laser diode 16, and therefore, is not 45° for the wavelength of $\lambda_0$. Accordingly, the plane of the polarization of the light beam rotated by the Faraday rotator (21-23) is slightly different from the transmission direction of the analyzer 26, so that a transmission loss is caused when the light beam passes through the analyzer 26. By the same reason, the light beam passes through the analyzer 29 with a similar transmission loss.

However, the isolation to temperature characteristic can be considerably improved by the design where the Faraday rotation angles of the two Faraday rotators are 45° not for the wavelength $\lambda_0$ but for different wavelengths of $\lambda_1$ and $\lambda_2$, respectively.

As has been well known in the prior art, the isolation $I_s$ of an optical isolator device is given by the following equation (2);

$$I_s = -10 \log (\sin^2 \Delta \theta) \text{ (dB)} \qquad (2),$$

where $\Delta \theta$ is a deviation of the Faraday rotation angle from 45°. The deviation $\Delta \theta$ from 45° is given by the following equation (3);

$$\Delta \theta = (P \cdot \Delta \lambda + q \cdot \Delta T) \times 45° \qquad (3),$$

Where P is a variation of the Faraday rotation angle for a unit wavelength and is given by ($-0.192$ %/nm), q being a variation of the Faraday rotation angle for a unit temperature and being (−0.252 %/°C.), Δλ being a wavelength deviation from the intended wavelength λ₀, and ΔT being a temperature variation from the room temperature (25° C.).

Figure 4:
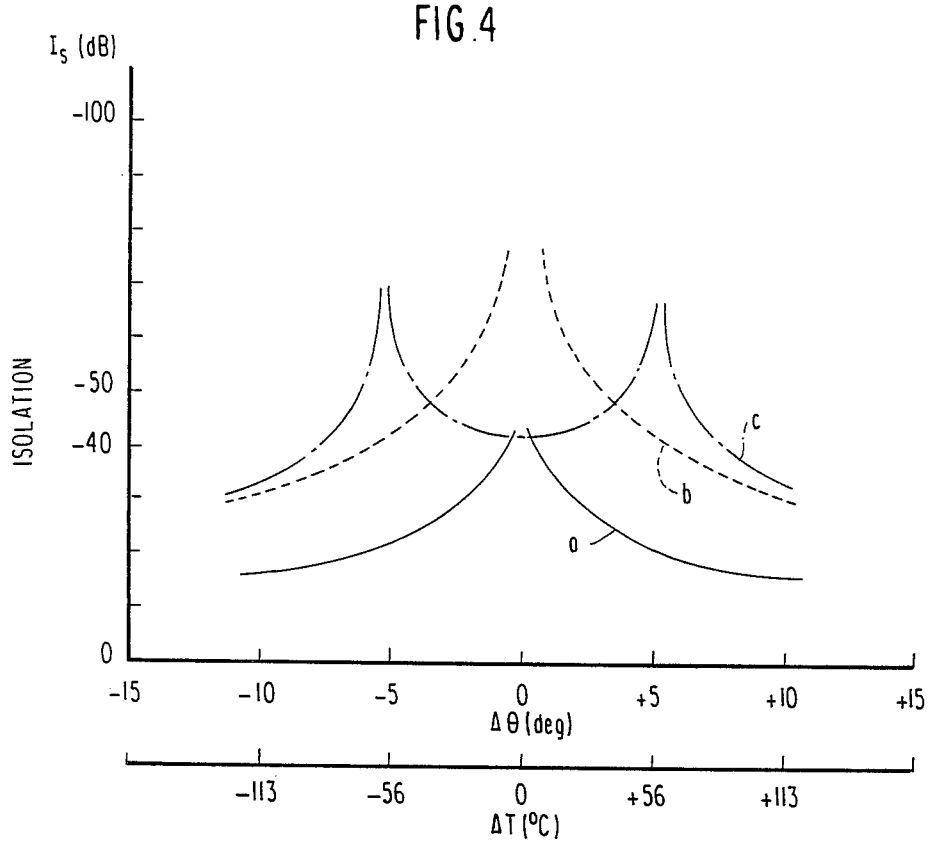
FIG. 4 is a view illustrating an isolation to temperature characteristic of the optical isolator device of the embodiment shown in FIG. 2 in comparison with those of different known optical isolator devices.

In the known isolator device as shown in FIG. 1, the Faraday rotation of 45° is adjusted for the wavelength of $\lambda_0$ and therefore, $\Delta\lambda = 0$. Accordingly, the angular deviation $\Delta\theta$ changes in response to the temperature variation $\Delta T$. For $\lambda_0 = 1,310$ nm, the isolation $I_s$ of the known isolator device is represented at a curved solid line a in FIG. 4 which is a graph having a vertical axis representing the isolation $I_s$ and a horizontal axis representing the angular deviation $\Delta\theta$ and the temperature variation $\Delta T$.

When two isolator devices are cascade-connected, the entire isolation $I_s$ is represented by a sum of isolations $I_{s1}$ and $I_{s2}$ of individual isolator devices. That is:

$$I_s = I_{s1} + I_{s2} \quad (4)$$
$$= -10 \log(\sin^2\Delta\theta_1) - 10 \log(\sin^2\Delta\theta_2).$$

Similarly, the total angular deviation $\Delta\theta$ is given by;

$$\Delta\theta = \Delta\theta_1 + \Delta\theta_2 \quad (5)$$
$$= (P \cdot \Delta\lambda_1 + q \cdot \Delta T) \times 45° + (P \cdot \Delta\lambda_2 + q \cdot \Delta T) \times 45°.$$

In the isolator device proposed by Fukushima et al as described hereinbefore, two isolator devices, each being similar to the known isolator device of FIG. 1, are cascade-connected. Therefore, $\Delta\lambda_1 = \Delta\lambda_2 = 0$, and $\Delta\theta \text{hd} 1 = \Delta\theta_2 = \Delta\theta_0$. Accordingly, $\Delta\theta = 2\Delta\theta_0$, and $I_{s1} = I_{s2} = I_{s0}$, then $I_s = 2I_{s0}$. This means that the isolation changes twice according to the variation of the temperature. For $\lambda_0 = 1,310$ nm, $I_s$ is shown at a curved broken line b in FIG. 4.

In the embodiment shown in FIGS. 2 and 3, $\Delta\lambda_1 = \lambda_1 - \lambda_0 = 1,250 - 1,310 = -60$, and $\Delta\lambda_2 = \lambda_2 - \lambda_0 = 1,370 - 1,310 = 60$. Accordingly, $\Delta\theta = -5.2 + 45 \cdot q \cdot \Delta T + 5.2 + 45 \cdot q \cdot \Delta T = 90 \cdot q \cdot \Delta T$, from equation (5). Therefore, angular deviation $\Delta\theta$ changes twice according to the temperature variation $\Delta T$. However, since $\Delta\theta_1 \neq \Delta\theta_2$, $I_s = I_{s1} + I_{s2}$ from equation (4) and $I_s < 2 I_{s0}$. Accordingly, the isolation to temperature characteristic of the embodiment is excellent over the wide temperature range. The isolation $I_s$ is shown at a curved dashed line c in FIG. 4.

It will be understood that the front stage Faraday rotator (21–23) can be designed to have the Faraday rotation angle of 45° for the longer wavelength $\lambda_2$, while the rear stage Faraday rotator being adjusted to have the Faraday rotation angle of 45° for the shorter wavelength $\lambda_1$.

Further, it will be noted that $\lambda_0$, $\lambda_1$, and $\lambda_2$ can be determined as desired without lowering the isolation below, for example, 40 dB which is a value usually desired for the optical isolator.

In the above-described embodiment, a Rochon polarizing prism is used for each of polarizers 25 and 28 and analyzers 26 and 29. However, the polarizers and analyzers can be made of one selected from calcite, rutile, and other materials having birefringence.

It will be understood that the analyzer 26 in FIG. 2 can be omitted because the transmission direction of the analyzer 26 is equal to that of the polarizer 28. In this modification, the dimension of the optical isolator is advantageously decreased.

In the case where the laser diode 16 is used as shown in FIG. 2, the polarizer 25 can be omitted because the laser diode generally emits a linearly polarized light beam. In this case, a small amount of the reflected light is injected into the laser diode. However, since the injected light beam is a TM mode linearly polarized light beam and since the light in a resonator of the laser diode is a TE mode, the laser diode is not badly affected by the injected light.

In the embodiment as described above, $(GdBi)_3(FeAlGa)_5O_{12}$ is used for the magnetooptical element, but other magnetic films, yitrium-iron garnet and other magnetooptical materials can be used for the magnetooptical element.

In FIG. 3, although $(GdBi)_3(FeAlGa)_5O_{12}$ film as the magnetooptical element 23 (or 24) is used together with the substrate 31, only the film can be used without the substrate. In this case, the film is formed with a thickness to determine the Faraday rotation angle of 45° for the wavelength of $\lambda_1$ or $\lambda_2$ by the liquid-phase epitaxial growing process. Then, the film is removed from the substrate by, for example, grinding off the substrate, and is disposed between the polarizer and the analyzer so that the surface of the film is oriented perpendicular to the optical axis.

What is claimed is:

1. An optical isolator device for permitting a polarized light beam to be transmitted therethrough in a forward direction along an optical axis but preventing a polarized light beam from passing therethrough in a reverse direction, which comprises:

a first optical port being disposed on said optical axis for receiving a forward light beam of a predetermined wavelength ($\lambda_0$) to transmit said forward light beam with a predetermined plane of polarization;

a second optical port being spaced from said first optical port on said optical axis for emitting said forward light beam from said optical isolator device, said second optical port seving as an input port for a reverse light beam;

first beam rotating means for rotating, by a first rotation angle in a rotating direction, the plane of polarization of a light beam passing therethrough in any one of the forward and the reverse directions, said first beam rotating means being disposed on said optical axis adjacent said first optical port to thereby rotate the plane of polarization of said forward light beam from said first optical port and to emit said forward light beam therethrough as a first rotated light beam with a first rotated plane of polarization;

first polarization selecting means having a first transmission direction of the plane of polarization for selectively allowing only one plane-polarized light beam to pass therethrough, said first polarization selecting means being disposed adjacent said first beam rotating means so that said first transmission direction coincides with said first rotated plane of polarization to thereby transmit said first rotated light beam therethrough;

second beam rotating means for rotating, by a second rotation angle in the same rotating direction, the plane of polarization of a light beam passing therethrough in any one of the forward and the reverse directions, said second beam rotating means being disposed on said optical axis between said first polarization selecting means and said second optical port to thereby rotate the first rotated plane of polarization of said first rotated light beam and to emit said forward light beam therethrough as a second rotated light beam having a second rotated plane of polarization;

one of said first and second beam rotating means being prepared to have a first rotation angle of 45° for a first light component having a wavelength ($\lambda_1$) shorter than said predetermined wavelength ($\lambda_0$), while the other being prepared to have a second rotation angle of 45° for a second light component having a wavelength ($\lambda_2$) longer than said predetermined wavelength ($\lambda_0$); and second polarization selecting means having a second transmission direction of the plane of polarization for selectively allowing only one plane-polarized light beam to pass therethrough, said second polarization selecting means being disposed at said second optical port so that said second transmission direction is oriented at an angle offset from said first transmission direction by 45° in the rotating direction to thereby transmit said second rotated light beam therethrough as said forward light beam, said reverse light beam passing through said second polarization selecting means with a plane of polarization equal to said second transmission direction but being stopped by said first polarization selecting means after rotated by said second beam rotating means.

2. An optical isolator device as claimed in claim 1, wherein each of said first and second beam rotating means is a Faraday rotator which comprises a cylindrical magnet means having a central axis coincidnet with said optical axis and a magentooptical element disposed on said central axis in said cylindrical magnet.

3. An optical isolator device as claimed in claim 2, wherein said cylindrical magnet means of said first and second beam rotating means is made in a single integral cylindrical body.

4. An optical isolator device as claimed in claim 2, wherein said magnetooptical element is made of a liquid-phase epitaxially grown $(GdBi)_3(FeAlGa)_5O_{12}$ film.

5. An optical isolator device as claimed in claim 1, wherein each of said first and second polarization selecting means is a Rochon polarizing prism.

6. An optical isolator device as claimed in claim 1, wherein each of said first and second polarization selecting means is made of one selected from calcite, rutile, and other materials having firefringence.

7. An optical isolator device as claimed in claim 1, further comprising third polarization selecting means disposed at said first optical port, said third polarization selecting means having a third transmission direction of the plane of polarization offset from said first transmission direction by an angle of 45° in an opposite direction to said rotating direction.

8. An optical isolator device as claimed in claim 7, further comprising fourth polarization selecting means disposed on said optical axis between said first beam rotating means and said first polarization selecting means, said fourth polarization selecting means having a fourth transmission direction of the plane of polarization oriented at an angle of said first transmission direction.

9. An optical isolator device as claimed in claim 8, wherein each of said third and fourth polarization selecting means is a Rochon polarizing prism.

10. An optical isolator device as claimed in claim 8, wherein each of said third and fourth polarization selecting means is made of one selected from calcite, rutile, and other materials having birefringence.

* * * * *

UNITED STATES PATENT AND TRADEMARK OFFICE
CERTIFICATE OF CORRECTION

PATENT NO. : 4,756,607

DATED : July 12, 1988

INVENTOR(S) : Watanabe et al

It is certified that error appears in the above-identified patent and that said Letters Patent is hereby corrected as shown below:

| | |
|---|---|
| COLUMN 2, LINE 32 | After "proposed" insert --optical--; |
| COLUMN 3, LINES 15 AND 16 | After "rotated" delete "light beam"; |
| COLUMN 4, LINE 31 | Delete "optcial" insert --optical--; |
| COLUMN 4, LINE 59 | Delete "magent" insert --magnet--; |
| COLUMN 7, LINE 11 | Delete "a" (first instance) and insert --$\underline{a}$--; |
| COLUMN 7, LINES 34 AND 35 | Delete "$\overline{\Delta\theta}$ hdl" insert --$\Delta\theta_1$--; |
| COLUMN 7, LINE 46 | Delete " $\neq$ " insert -- $\Delta$ --; |
| COLUMN 7, LINE 50 | Delete "c" insert --$\underline{c}$--; |
| COLUMN 10, LINE 14 | Delete "firefringence" insert --birefringence--; |

Signed and Sealed this

Seventh Day of March, 1989

*Attest:*

DONALD J. QUIGG

*Attesting Officer*     *Commissioner of Patents and Trademarks*